United States Patent [19]

Brown

[11] Patent Number: 4,494,028

[45] Date of Patent: Jan. 15, 1985

[54] INTEGRAL COAXIAL COMMUTATION AND ROTOR MAGNETS AND APPARATUS AND METHOD FOR MAKING SAME

[75] Inventor: Fred A. Brown, Woodstock, N.Y.

[73] Assignee: Rotron Incorporated, Woodstock, N.Y.

[21] Appl. No.: 428,828

[22] Filed: Sep. 30, 1982

[51] Int. Cl.³ .............................................. H02K 23/04
[52] U.S. Cl. ..................................... 310/156; 310/266
[58] Field of Search ................... 310/46, 49, 154, 156, 310/68, 268, 266; 335/306, 302

[56] References Cited

U.S. PATENT DOCUMENTS

| | | | |
|---|---|---|---|
| 3,164,735 | 1/1965 | Lichowsky | 310/156 |
| 3,299,335 | 1/1967 | Wessels | |
| 3,484,635 | 12/1969 | MacKallor, Jr. | 310/266 |
| 3,493,831 | 2/1970 | Roberts, Sr. | 318/138 |
| 3,840,761 | 10/1975 | Muller | 310/49 R |
| 4,009,406 | 2/1977 | Inariba | 310/164 |
| 4,197,475 | 4/1980 | Ban et al. | 310/203 |
| 4,260,920 | 4/1981 | Nakamura et al. | 310/156 |
| 4,311,933 | 1/1982 | Riggs et al. | 310/156 |
| 4,322,666 | 3/1982 | Müller | 318/254 |

FOREIGN PATENT DOCUMENTS 838910   6/1981   U.S.S.R. ............................. 310/156

OTHER PUBLICATIONS

Japanese document entitled "Two-Phase Transistor Motor" made by Matsushita.

Primary Examiner—William M. Shoop
Assistant Examiner—D. L. Rebsch
Attorney, Agent, or Firm—Brumbaugh, Graves, Donohue & Raymond

[57] ABSTRACT

An integral field and commutation magnet for use in DC brushless motor has both commutation and field magnet portions. Magnetized segments in both the field and commutation portions have oppositely oriented magnetic fields in the outward radial direction. An apparatus and method for making the one piece integral field and commutation magnet employ a fixture with a current conductor associated with magnetic flux paths corresponding to the segments of the commutation and field magnet portions to magnetize a single piece of permanently magnetizable material.

12 Claims, 9 Drawing Figures

INTEGRAL COAXIAL COMMUTATION AND ROTOR MAGNETS AND APPARATUS AND METHOD FOR MAKING SAME

BACKGROUND OF THE INVENTION

This invention relates to an integral field and commutation magnet for a DC brushless motor, and an apparatus and method for making it.

In direct current motors, a commutation device properly commutates the current in the stator winding or windings at appropriate points in the rotor's rotation. Therefore, the commutation arrangement must be correctly located with respect to the angular position of the rotor so that the commutation arrangement accurately effects switching of the current windings at the proper positions of the rotor relative to the stator.

Various types of cummutation arrangements have been used in DC motors having permanent magnet rotors. These energize a new stator winding or reverse the current in the stator winding each time the rotor rotates to preselected angular positions or commutation points. Hall effect devices have provided a successful means for sensing commutation points to control a semiconductor switching circuit that switches or reverses the stator current. Commutation magnets have been affixed to the rotor to alter the state of the Hall device or devices as a magnet repeatedly rotates into and out of proximity with a Hall device.

In the past, when permanent magnet commutation magnets have been employed, distinct from the rotor permanent magnets, or field magnets, these have been separately made and magnetized and separately mounted on the rotor in the correct angular relationship to the rotor magnets. This has meant molding the commutation segments of a commercially available plastic permanent magnetic material, for example, and subjecting each segment to a magnetic field of the appropriate intensity and direction, either before or after the magnets had been attached to the rotor.

BRIEF SUMMARY OF THE INVENTION

In accordance with the present invention, field and commutation magnet segments are integrally formed for use in a brushless DC motor. A single piece of permanent magnetic material provides both the rotor magnets and the commutation magnets that control current flow to the stator windings. The integral magnet has distinct permanent magnet segments formed thereon, each of the required size, angular extent and polarity for its particular purpose. The commutation magnet segments are correctly angularly related to the position of field magnets to interact with one or more Hall devices located at one or more particular preselected positions.

In a preferred embodiment, the integral field commutation magnet for a two pole inverted brushless DC motor has coaxial annular commutation and field magnet portions axially adjacent. The commutation sections are angularly adjacent and oppositely polarized. The integral magnet structure is an annular ring with coaxial annular commutation and field magnet portions. For a particular two pole motor, the commutation portion comprises two substantially 180° magnetized segments which have oppositely oriented magnetic fields, with one segment having a northsouth orientation in the outward radial direction and with one segment having a south-north orientation in the outward radial direction. The field magnet portion comprises a radially north-south magnetically oriented segment spaced from a radially south-north magnetically oriented segment. Unmagnetized segments are present between the magnetized segments in the field portion of the magnet. The magnetized field segments may extend 135° each, for example, with the unmagnetized segments between them extending 45° each. The north-south magnetized segment of the field portion aligns with the north-south magnetized segment of the commutation portion, and the south-north magnetized segment of the field portion also axially aligns with the south-north magnetized segment of the commutation portion. The unmagnetized segments of the field portion of the exemplary two pole embodiment are diametrically opposed and axially aligned with the ends of the commutation segments.

The invention also provides an apparatus and method for making the unitary commutation and field magnet. The apparatus includes a fixture having a current path and flux paths. Current through the current path, from a commercially available source of the kind typically used to provide high currents to magnetizing fixtures, establishes magnetizing flux in the flux paths. The flux paths conduct flux through the single piece of permanently magnetizable material that becomes the integral field and commutation magnets.

In the preferred embodiment, the apparatus comprises first means for magnetizing a first portion at a first axial location of a generally annular ring of magnetizable material to form oppositely oriented magnetic fields in adjacent segments for the commutation portion, and means for simultaneously magnetizing a second portion at a second axial location of said ring to form alternate oppositely oriented magnetic fields only in spaced segments of a field portion of the ring, leaving unmagnetized segments between the oppositely oriented magnetized segments of this field portion. The magnetic fields in the magnetized segments of the field portion can be substantially aligned with the magnetic fields in the magnetized segments of the commutation portion.

The fixture has a first portion that provides the first means for magnetizing the commutation segments and a second portion that provides the second means for magnetizing the field magnet segments of the one-piece magnet. The first portion has two segments with outer cylindrical surfaces extending substantially 180° each and fitting into the interior of the annular member to be magnetized. The second portion also has cylindrical outer surfaces, but extending 135° to fit closely the interior of the annular member and form the field magnet segments. Openings are left between the two 135° cylindrical surfaces to leave unmagnetized the 45° segments between field magnet sections. A U-shaped current conductor has legs projecting past the first and second portion in alignment with the centers of the 45° openings and the ends of the nearly 180° surfaces. A connecting bar between the legs of the U-shaped conductor completes the U-shape, connecting the two legs at their ends farthest from the current source.

A method according to the invention comprises permanently magnetizing commutation and field portions of a single piece of magnetizable material. The unmagnetized material is first physically formed and then selectively magnetized in selected areas, by locating the flux conducting portions of a fixture in juxtaposition with those areas, to produce both commutation segments and field segments. To produce the particular annular magnet of the preferred embodiment described herein, the annular ring of magnetic material is placed onto the fixture described. Direct current is conducted through the U-shaped conductor. The flux established in the flux paths produces the permanent magnetization in the configuration described above.

By providing a one piece unitary magnet, the assembly of a DC brushless motor is simplified, the number of parts is reduced and the relationship of the commutation segments and field magnets is always the same. The magnetizing apparatus and method provide easy, accurate formation of the unified magnet structure.

The above and further advantages of the invention will be better understood with reference to the following detailed description of the preferred embodiments taken in combination with the attached drawings.

DETAILED DESCRIPTION OF THE PREFERRED EMBODIMENTS

Figure 1:
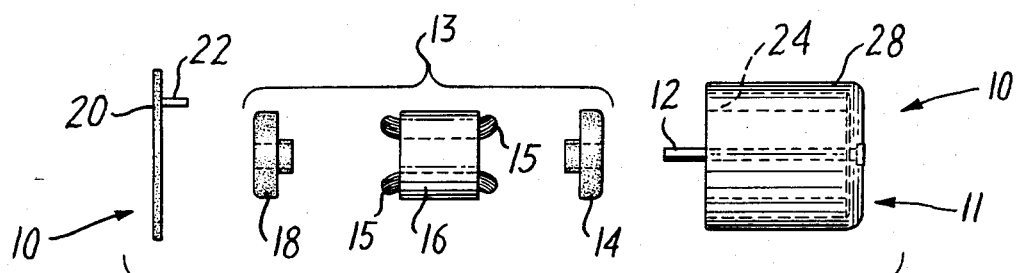
FIG. 1 is an exploded illustration of an inverted, brushless, permanent magnet direct current motor having an integral commutation and field magnet according to the invention.

In FIG. 1 an inverted brushless permanent magnet DC motor 10 has a rotor assembly 11, with an axial shaft 12. A stator assembly 13 includes a first plastic cup 14, windings 15, a stator core 16, and a second plastic cup 18. At the ends of the wound stator core 16, the cups protect the windings and ordinarily connect to an arbor that extends through the core, forming, with suitable bearings and the like, known assembly features that are not a part of the invention. A circuit board 20 maintains a Hall device 22 in a proper relationship to the stator. The Hall device 22 and an associated circuit control the current in the windings 15, depending upon the state of the Hall device. Commutation magnet sections of an integral magnet 24 secured on the rotor regularly alter the condition of the Hall device to effect commutation. The art is replete with circuits capable of controlling stator winding energization in this manner and the particular circuit is not a part of this invention.

Figure 1A:
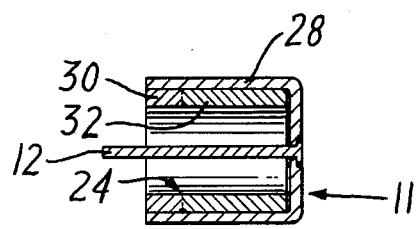
FIG. 1A is a cross-sectional view of a rotor incorporating the magnet of FIG. 1.

Shown in cross-section in FIG. 1A, the rotor assembly 11 comprises a cup 28 that houses the integral magnet 24. This magnet is a unitary magnet having a commutation portion 30 (shown at its left end in FIG. 1A) and a field magnet portion 32 (shown at its right end in FIG. 1A). As can be seen from FIGS. 1 and 1A, when the components of the motor 10 are assembled, the circuit board 20 will be at the open end of the cup 12 and the Hall device 22 will be just inside of commutation portion 30. Here, the Hall device is subject to the magnetic fields established by the commutation portion of the magnet 24, as the rotor rotates.

Figure 2A:
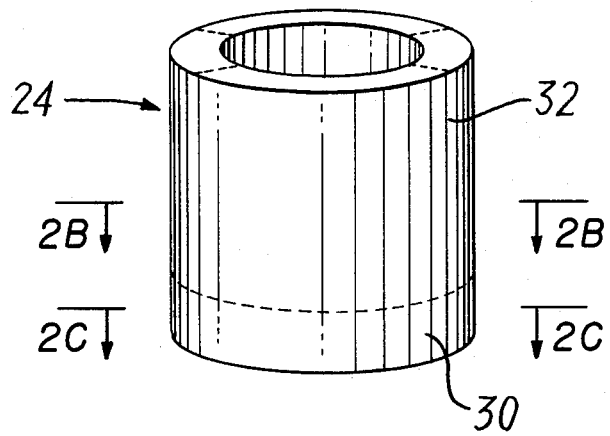
FIG. 2A is an enlarged perspective view of the unitary magnet of FIG. 1.
Figure 2B:
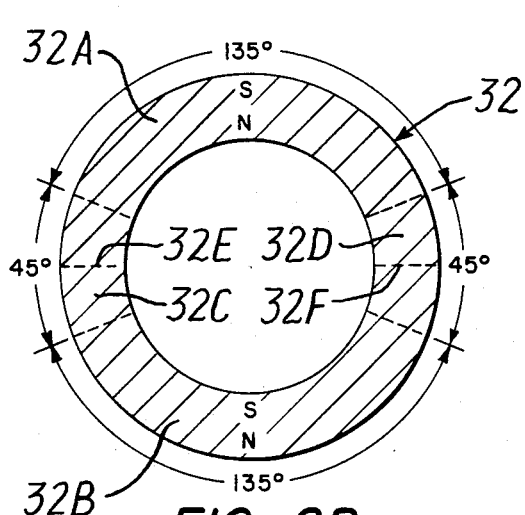
FIG. 2B is a cross-sectional view taken along line 2B of FIG. 2A, in the direction indicated by the arrows.
Figure 2C:
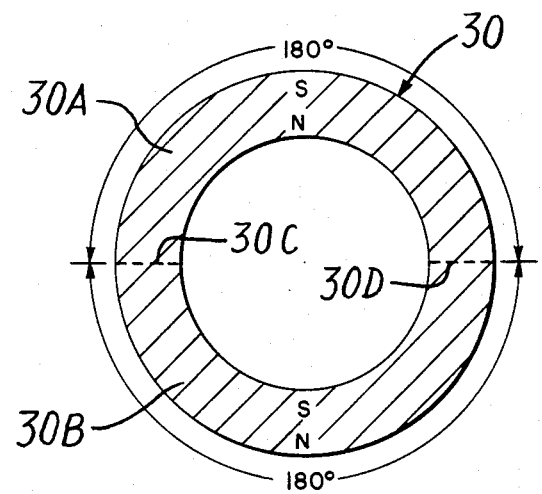
FIG. 2C is a cross-sectional view taken along line 2C of FIG. 2A, in the direction indicated by the arrows.

The orientation of the magnetic fields in the magnet 24 is best shown in FIGS. 2A, 2B and 2C. The commutation magnet portion 30 is at the magnet's lower end in FIG. 2A and the field magnet portion 32 is at its upper end. In FIG. 2C the commutation portion 30 is seen to have two adjacent oppositely radially magnetized commutation segments 30A and 30B, each extending through nearly 180°. The segment 30A has a permanent north-south magnetization in the outward radial direction, which is to say proceeding outward radially from the central axis, and the segment 30B has a south-north magnetization in the outward radial direction.

FIG. 2B shows in cross-section the magnetic field orientations in the field magnet portion 32 of the magnet 24. The field magnet portion 32 has alternately magnetized segments 32A and 32B and unmagnetized segments 32C and 32D arranged so that the magnetized segments are separated and spaced from each other by the unmagnetized segments. The magnetized segments 32A and 30B are substantially equal in size and extend about 135°. The unmagnetized segments 32C and 32D each occupy about 45° of circular arc. Permanently magnetized segment 32A has a north-south magnetization in the outward radial direction and aligns with commutation segment 30A, which has the same magnetic orientation. Similarly, field segment 32B, having a south-north orientation in the outward radial direction aligns with commutation segment 30B which has that magnetic orientation. The centers of the unmagnetized segments 32C and 32D, indicated by the broken lines 32E and 32F in FIG. 2B, align with boundaries 30C and 30D between the commutation segments 30A and 30B. The number and lengths of the unmagnetized and magnetized segments of the field portion, and the number and relative sizes of the commutation segments will differ with the number of poles of a particular brushless DC motor and the particular commutation circuit, for example.

Figure 3A:
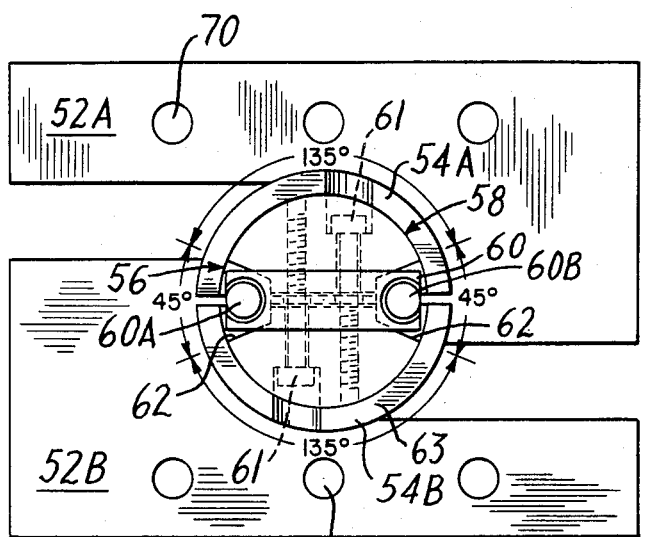
FIG. 3A is a front elevational view of a magnetizing fixture forming part of an apparatus for producing an integral magnet.
Figure 3B:
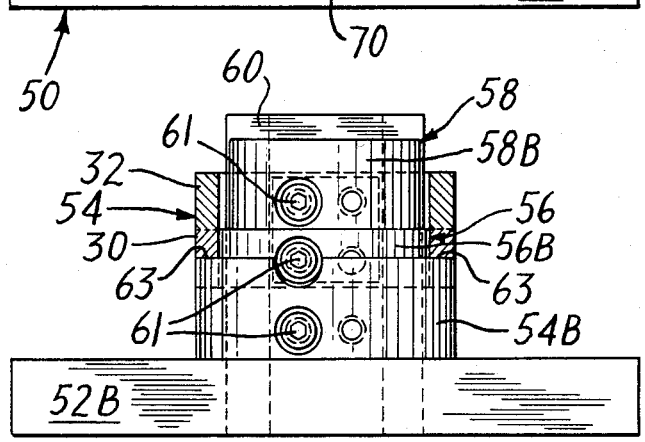
FIG. 3B is a bottom plan view of the magnetizing fixture of FIG. 3A with an annular magnetic member shown thereon in section.
Figure 4A:
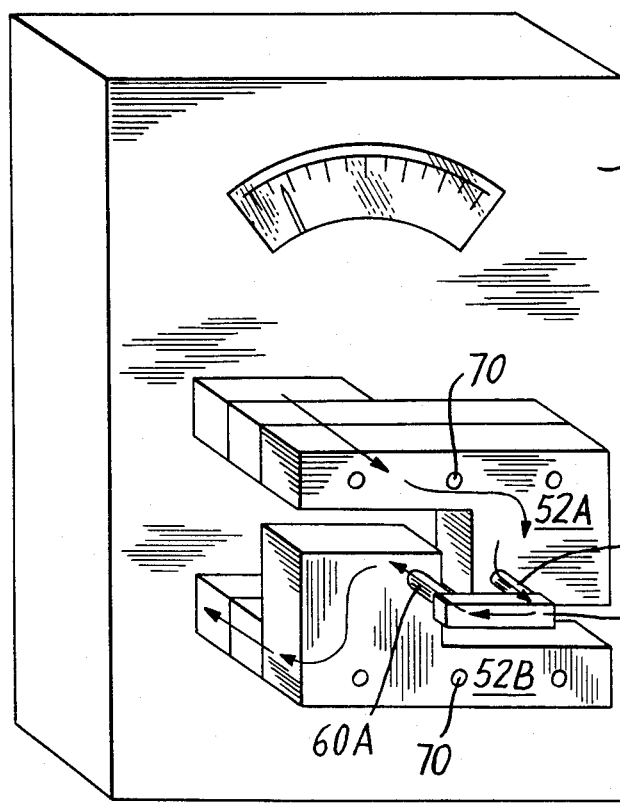
FIG. 4A is a perspective view of the current path parts of the fixture connected to a current source.
Figure 4B:
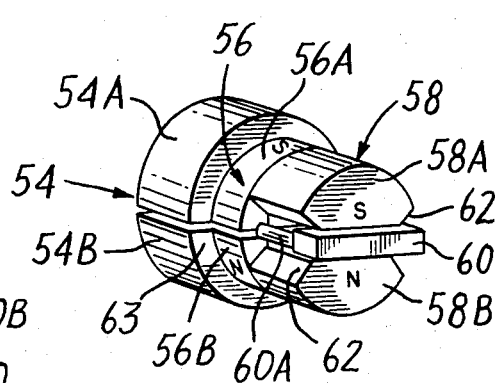
FIG. 4B is a perspective view of the flux and current conductors of the fixture.

Referring now to FIGS. 3A, 3B, 4A and 4B, the apparatus and method for producing a unitary magnet according to the invention will be described. In FIG. 3A, a magnetizing fixture 50 is suitable for magnetizing a ring of magnetizable material to produce the unitary magnet according to the invention. It has two conductive connectors 52A and 52B, two nonmagnetic and nonconductive semicircular plastic plates 54A and 54B, a commutation magnetizing fixture portion 56, a field magnetizing fixture portion 58, and a current bar 60, forming with two conductive legs 60A and 60B a U-shaped current conductor connected with the conductive connectors 52A and 52B, as best seen in FIG. 4A. The commutation fixture portion 56, as can be seen in FIG. 4B, is made up of a pair of substantially semicircular flux conductors 56A and 56B, and the field fixture portion 58 is made up of a pair of flux conductors 58A and 58B. The pairs are joined by transverse set screws 61 seen in FIGS. 3A and 3B. The flux conductors, if current conductive, are insulated or spaced from the current conductors.

The field magnetizing fixture portion 58, as shown in FIG. 3A, has diametrically opposed V-shaped cut-outs 62 each extending through about 45°. The commutation fixture portion 56 is circular in shape, but has no corresponding V-shaped cut-out. Rather, the flux conductors 56A and 56B extend substantially 180° to closely proximate one another at their ends. The commutation fixture portion 56 and the nonmagnetic plastic plate 54 have aligned bores that are aligned with the V-shaped cut-outs 62 and receive the two legs 60A and 60B of the U-shaped conductor. The conductive connectors 52A and 52B have mounting holes 70 which allow attachment of the fixture to the output conductors of a conventional source of electrical current 72, for example Model 1500A magnetic charger available from RFL Industries Inc.

To form the magnet, a ring 24, of magnetizable, but as yet, unmagnetized material is located in the cup 28. The ring and cup are then placed fully onto the magnetizing fixture 50 in contact with the land 63 formed by the semicircular plastic plates 54A and 54B. The current source 72 is energized, and current flows through the current paths of the fixture in the direction indicated by the arrows of FIG. 4A. Magnetic fields are set up in the flux conductors forming the field portion 58 and the commutation portion 56 of the fixture. The flux path continues through the permanent magnet material of the ring 24, establishing the permanent magnetic fields indicated in FIGS. 2B and 2C. Relatively no magnetic field exists in the V-shaped cut-outs 62 and the corresponding sections of the ring 24 remain unmagnetized.

After the current source 72 is switched off, the rotor and stator assemblies, the commutation circuit with Hall device correctly located for proper commutation, and the necessary bearings, etc. are assembled to complete the motor. One magnetizing step using the fixture and current source has established the four magnet sections, all accurately located with respect to each other. Only one magnet has had to be mounted in the rotor cup.

Although specific preferred embodiments have been described in detail, modifications within the spirit and scope of this invention will be readily apparent. For example, the invention is not limited to two magnetized segments on each of the commutation and field portions, since other numbers of magnetized segments can be produced for other than two pole DC motors. An inverted motor has been described, but a magnet fixture and method for conventional internal rotor motors can be readily provided in accordance with the invention. The foregoing description of the preferred embodiments, therefore, is not to be construed as limiting the scope of this invention, which is defined in the appended claims.

What is claimed is:

1. An integral annualr field and commutation magnet for a brushless DC motor formed on a single piece of permanently magnetized material and including a first annular field magnet portion at a first location and a second annular commutation magnet portion at a second location axially displaced from the first location, said field magnet portion having magnetized and unmagnetized sectors, said unmagnetized sectors being substantially unmagnetized portions of the magnetic material of said piece, being adjacent to magnetized sectors of the field magnet portion and integral therewith and having a substantial angular length.

2. The magnet according to claim 1, wherein adjacent sectors of the commutation magnet portion are oppositely magnetized in directions proceeding radially outward from a central axis of the magnet and said adjacent sectors form said pattern of magnetization as a continuous pattern of adjacent north and south poles on an axially extending surface and encircling the axis.

3. The magnet according to claim 2, wherein at least two of the field magnet portion sectors are permanent magnet sectors oppositely polarized in directions proceeding radially outward from a central axis of the magnet, said oppositely polarized sectors and said unmagnetized sectors forming a sequence of north and south poles and substantially unmagnetized locations on said axially extending surface and encircling the axis.

4. The magnet according to claim 1, wherein axially adjacent permanent magnet sectors of commutation and field portion are magnetized in corresponding directions.

5. The magnet according to claim 1, wherein the magnet is an annular ring adapted for use in an inverted motor, the field magnet portion being at one end and the commutation magnet portion being at the other end, the field magnet portion including two sectors oppositely magnetically polarized in directions proceeding radially outward from the axis of the ring, the two sectors of the field magnet portion being spaced apart with unmagnetized sectors of the annular ring located therebetween, the commutation portion including two sectors oppositely magnetically polarized in directions proceeding radially outward from the axis and each of the two sectors of the commutation portion extending substantially 180° about the annular ring.

6. A motor including a magnet according to claim 1 and including at least one stator field winding for establishing a stator field in the location of the field magnet portion of the integral magnet, at least one Hall device located proximate the commutation portion of the magnet and circuit means for altering the energization of the winding in dependence on the angular position of the commutation magnet portion.

7. The motor according to claim 6, wherein the motor is inverted, the magnet comprising an annular ring mounted within a cup, the commutation and field magnet sectors being at opposite ends of the ring, the stator field winding and an associated core being located inside the ring in proximity to the field magnet portion, said circuit means being mechanically supported on the stator structure adjacent the commutation magnet portion, and the Hall device extending inward from the circuit means into proximity with the commutation portion.

8. The magnet according to claim 1 wherein the first and second locations of the field and commutation portions are at opposite ends of the annular one piece magnet.

9. An integral annular field and commutation magnet for a brushless DC motor having integral annular field and commutation portions at axially displaced first and second locations, said commutation portion comprising integral alternating oppositely radially magnetized commutation magnet sectors in close succession around the annular commutation magnet portion and the field magnet portion comprising integral oppositely radially magnetized field magnet sectors and integral substantially unmagnetized sectors of substantial angular length angularly adjacent radially magnetized sectors in the field magnet portion and defining null sectors.

10. The magnet according to claim 9, wherein the field and commutation portions form the effective ends of the annular magnet.

11. The magnet according to claim 9, wherein polarized field magnet sectors bound each null sector in the circumferential direction around the annular magnet and each null sector of the field magnet sector is bound in an axial direction by at least one polarized commutation sector.

12. The magnet according to claim 9, wherein each null sector has an effective arcuate extent greater than 20° mechanical.

* * * * *